No. 609,608. Patented Aug. 23, 1898.
W. R. CLARKE.
APPARATUS FOR MAKING CHLORATES AND BLEACHING LIQUOR.
(Application filed Oct. 26, 1897.)
(No Model.) 2 Sheets—Sheet 1.
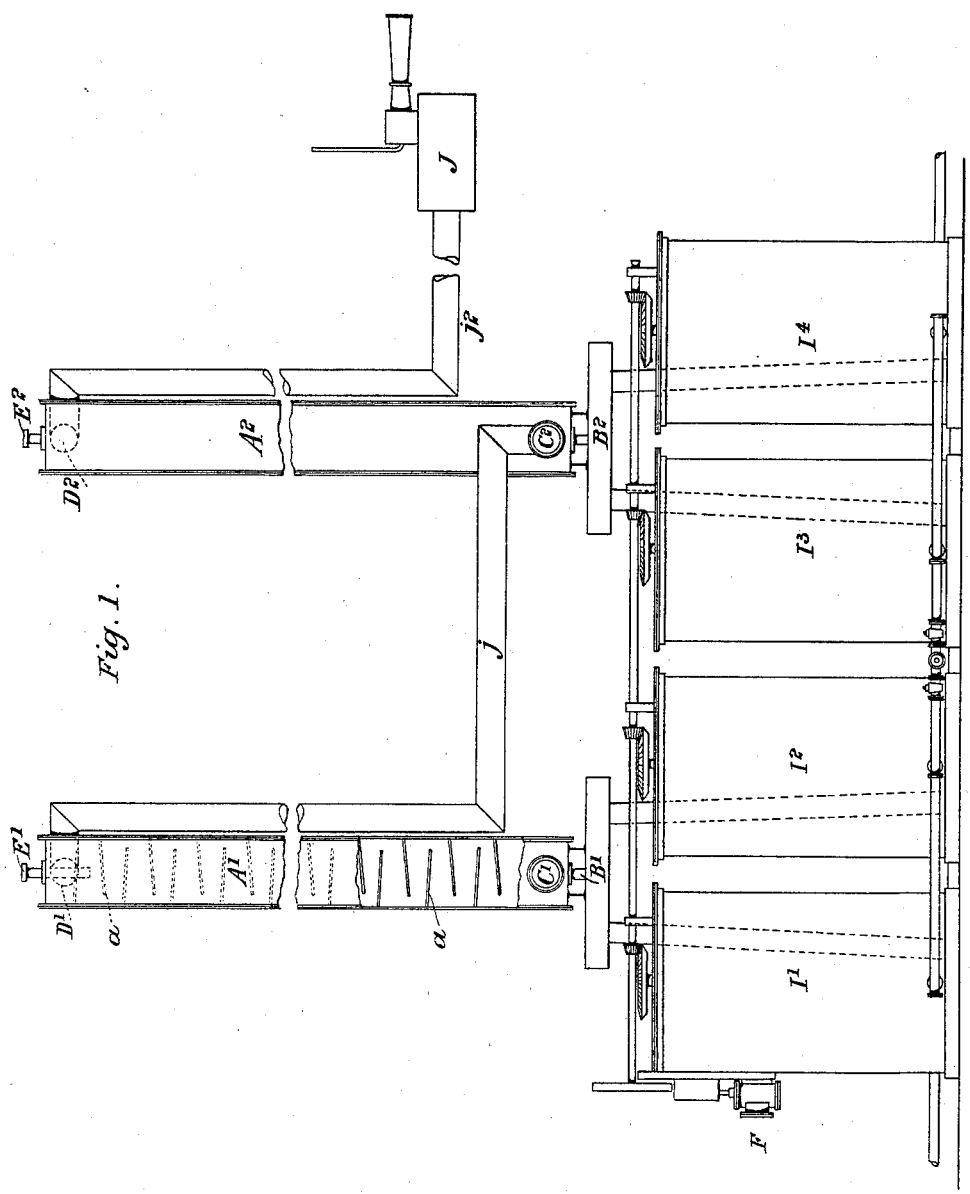

No. 609,608. Patented Aug. 23, 1898.
W. R. CLARKE.
APPARATUS FOR MAKING CHLORATES AND BLEACHING LIQUOR.
(Application filed Oct. 26, 1897.)
(No Model.) 2 Sheets—Sheet 2.
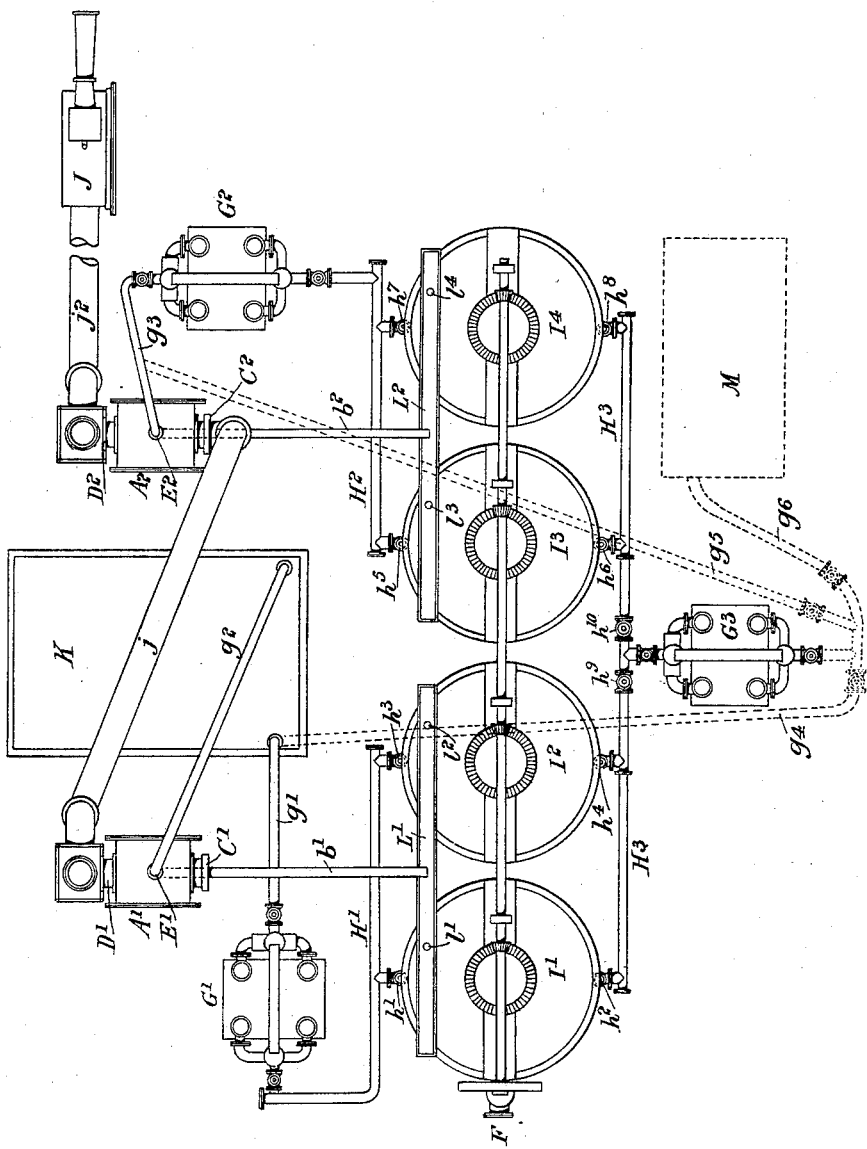

UNITED STATES PATENT OFFICE.

WILLIAM R. CLARKE, OF LIVERPOOL, ENGLAND, ASSIGNOR TO THE UNITED ALKALI COMPANY, LIMITED, OF SAME PLACE.

APPARATUS FOR MAKING CHLORATES AND BLEACHING LIQUOR.

SPECIFICATION forming part of Letters Patent No. 609,608, dated August 23, 1898.

Application filed October 26, 1897. Serial No. 656,422. (No model.)

*To all whom it may concern:*

Be it known that I, WILLIAM RANDAL CLARKE, works manager, a subject of the Queen of Great Britain and Ireland, residing at G 11 Exchange Buildings, Liverpool, in the county of Lancaster, England, have invented certain improved means for effecting the absorption of chlorin gas applicable to the manufacture of chlorates and bleaching liquors, of which the following is a specification.

No difficulty is experienced in absorbing, in milk of lime or of magnesia, strong chlorin gas uncontaminated with inert gas by bringing the chlorin gas into contact with the milk of lime or of magnesia when agitated. When, however, chlorin gas contaminated with a large amount of inert gas—such, for instance, as the gases produced by the Deacon process—has to be used, the difficulty of absorbing the chlorin is very great.

This invention has for its object to provide means whereby the absorption of the chlorin from such contaminated gases is effected in a satisfactory manner, there being obtained a good production of chlorate and a concentrated solution, resulting in considerable economy in raw materials and labor.

According to this invention I employ a chamber or tower of considerable height relatively to its width or horizontal sectional area, its height being, say, from ten or fifteen to twenty times greater than its width. This chamber or tower is provided with a number of shelves or partitions slightly inclined to the horizon and permitting the gases to ascend in a zigzag direction through the chamber or tower by apertures in or at the sides of each shelf or partition, so that the apertures in successive shelves or partitions are at opposite sides of the chamber or tower or are alternately in the middle and at the sides of the shelves or partitions. At the bottom of the said chamber or tower I provide an outlet for the milk of lime or of magnesia, and just above that I provide an inlet for the gases from which the chlorin is to be absorbed. At the top of the chamber or tower, just above the top partition or shelf, I provide an outlet for the gases, and just below that I provide an inlet for the milk of lime or of magnesia. I draw the gases from which the chlorin is to be absorbed through the chamber or tower, which may be done by means of a steam-jet or other forcing device, and I force the milk of lime or of magnesia in through the inlet at the top of the chamber or tower. I find it advisable to have about one cubic foot of milk of lime or of magnesia for every fifty to one hundred cubic feet of the gases passing through the chamber or tower during a given time. The milk of lime or of magnesia can flow from the bottom of the chamber or tower into a receiving-tank provided with an agitator and be pumped from this receiving-tank again to the top of the chamber or tower and be kept circulating in this manner until it has absorbed sufficient chlorin gas. In order to prevent the liquid from becoming too hot, I refrigerate it on its way to the tower, which may be done, for example, by passing it through piping immersed in cold water circulated over the coil or renewed as frequently as required. When the lime or magnesia has thus been transformed into chlorate, I may employ it for the manufacture of other chlorates in the well-known manner. For the manufacture of chlorates the milk of lime or of magnesia may be made of such concentration that the finished liquor tests afterward from 50° to 60° on Twaddell's hydrometer. If bleaching liquor is to be made, the operation may be carried out as hereinbefore described; but care must be taken to not fully saturate the milk of lime with the chlorin gas; otherwise chlorate is liable to form. It is also advisable not to use for this purpose too strong a solution of lime. Good results have been obtained with milk of lime testing 7° on Twaddell's hydrometer. In order to avoid loss of chlorin, I may take the gases from the top of one chamber or tower and cause them to pass through a second similar chamber or tower wherein fresh milk of lime or of magnesia is kept circulating, the milk of lime or of magnesia from this second chamber or tower being afterward used in the first chamber or tower. Two such chambers or towers will generally be sufficient to absorb all the chlorin from gases such as are furnished by the Deacon process; but more than two such chambers or towers may be used, if required.

I will now describe, with reference to the accompanying drawings, the best arrangement of apparatus with which I am acquainted for carrying this invention into practical effect; but I premise that I do not limit myself to the precise details of the arrangement illustrated.

Figure 1 is a diagrammatic elevation, and Fig. 2 a diagrammatic plan, of the apparatus. Certain parts which are shown in the plan are not repeated in the elevation to avoid confusion of what is shown in Fig. 1.

In Fig. 1 part of the tower or chamber $A'$ is broken away to show the arrangement of the plates or shelves $a$ therein. Two chambers or towers $A'$ $A^2$ are shown in this arrangement, as hereinbefore mentioned. The said chambers or towers may be provided with hermetically-closable doors in their sides for giving access to the partitions or shelves for cleaning or other purpose.

$B'$ $B^2$ are the outlets for milk of lime or of magnesia, and $E'$ $E^2$ are the inlets for the same, they passing through the top of the towers, as shown in dotted lines on the tower $A'$, and through the first plate or division $a$, so as to terminate over the second plate or division.

J is a steam-jet or other suitable forcing device by which the gases from a Deacon decomposer, for example, are drawn through the inlet $C'$ into the tower $A'$, up which they pass and thence pass by the outlet $D'$, pipe $j$, and inlet $C^2$ into the tower $A^2$, up through the tower $A^2$, and thence through the outlet $D^2$ and pipe $j^2$ and device J to the place of discharge. The said gases pass alternately in opposite directions over the shelves or partitions in the towers, the milk of lime or of magnesia passing down over the said shelves or plates, (in the reverse direction to the gases,) entering at $E'$ and $E^2$ and leaving at $B'$ and $B^2$.

$I'$ $I^2$ $I^3$ $I^4$ are receiving-tanks provided with agitators driven by an engine F.

$G'$ $G^2$ $G^3$ are pumps for passing the liquid through the various portions of the apparatus, as hereinafter described.

K is a refrigerator for cooling the liquid by its passing through a coil of piping immersed in cold water in the said refrigerator.

The tanks $I'$ $I^2$ constitute one pair connected with each other and with the suction of a pump $G'$ by a pipe $H'$, provided with valves $h'$ $h^3$, and the tanks $I^3$ $I^4$ constitute another pair connected with each other and with the suction of a pump $G^2$ by a pipe $H^2$, provided with valves $h^5$ $h^7$, and all the said tanks are connected together and with the suction of a pump $G^3$ by a pipe $H^3$, provided with valves $h^2$, $h^4$, $h^6$, $h^8$, $h^9$, and $h^{10}$. The delivery of the pump $G'$ is connected by a pipe $g'$ to one end of the coil in the refrigerator K, the other end of the said coil being connected by a pipe $g^2$ to the inlet for milk of lime or of magnesia to the tower $A'$. The delivery of the pump $G^2$ is connected by a pipe $g^3$ directly to the inlet for milk of lime or of magnesia to the top of the tower $A^2$. The delivery of the pump $G^3$ has three branches $g^4$ $g^5$ $g^6$, controlled by valves. The branch $g^4$ is connected to the inlet-pipe of the coil in the refrigerator K, the branch $g^5$ to the inlet-pipe $g^3$ to the tower $A^2$, and the branch $g^6$ to a reservoir (indicated at M) for receiving the finished chlorate liquid or bleaching liquid, as the case may be.

It is also necessary to have a storage-tank (not shown) for fresh milk of lime or of magnesia situated at a sufficient elevation to allow the contents to flow into either of the tanks $I'$ $I^2$ $I^3$ $I^4$.

Across each pair of tanks $I'$ $I^2$ and $I^3$ $I^4$ is a trough $L'$ $L^2$, each provided with two outlets $l'$ $l^2$ and $l^3$ $l^4$, which are controlled by plugs. The outlets for liquid from the bottoms of the towers $A'$ $A^2$ are connected, respectively, with these troughs by the pipes $b'$ $b^2$.

The working of the apparatus is as follows: The tank $I^2$ is presumed to contain milk of lime or of magnesia already partially saturated with chlorin. By opening the valve $h^3$ and closing the valve $h'$ the liquid is passed by the pump $G'$ from the tank $I^2$ through the pipes $H'$ and $g'$ and through the coil in the refrigerator K, wherein it is cooled and passes by the pipe $g^2$ into the top of the tower $A'$, and as it descends over the plates or partitions $a$ in the said tower it absorbs more chlorin from the gas passing up through the said tower. The liquid then flows out by the outlet $B'$ and pipe $b'$ into the trough $L'$ and through the opening $l'$ (from which the plug is removed) into the tank $I'$, from which the said liquor flows back into the tank $I^2$ by the pipe $H^3$, the valves $h^2$ and $h^4$ being both open and the valve $h^9$ closed. Thus the liquid circulates through the tower $A'$ and refrigerating-tank K until it is nearly saturated. Then the valves $h^2$ $h^4$ are closed and the contents of the tank $I^2$ are pumped through the tower $A'$ into the tank $I'$. When the tank $I'$ is full, the valve $h^3$ is closed and the valve $h'$ is opened, and the liquid is now circulated from the bottom of the tank $I'$, through the refrigerator K and through the tower $A'$, back to the tank $I'$, and this operation is continued until the analysis of a sample of the liquid shows that it is fully saturated, when the pump $G'$ is stopped and the valve $h'$ is closed. The suction-pipe of the pump $G^3$ is then, by opening the necessary valves, put in communication with the tank $I^3$, which contains milk of lime or of magnesia which has been circulated through the tower $A^2$ and contains some chlorin. The delivery-pipe branch $g^4$ is put in communication with the inlet of the coil in the refrigerator K, so that the pump $G^3$ delivers the contents of the tank $I^3$, through the tower $A'$, into the tank $I^2$, the opening $l^2$ in the trough $L'$ being opened for the purpose and that at $l'$ being closed. When the tank $I^2$ is filled again, the pump $G^3$ is stopped, the valve $h^3$ is opened, and the pump $G'$ put in operation, and the liquid from the tank $I^2$ is pumped through the refrigerator and passes through the tower $A'$ and back to the tank $I^2$. In the meantime the tank $I'$ has been put in communication with the suction of the pump $G^3$ (the valves $h^2$ and $h^9$ being opened and the valve $h^6$ closed) and the contents of the said tank I' pumped through the pipe $g^6$ into the tank M. As soon as the tank I' is empty the liquid is circulated, as first described, from the tank $I^2$, through the refrigerator K and tower A', into the tank I', and from thence back to the tank $I^2$. The fresh milk of lime or of magnesia contained in the tank $I^4$ is similarly pumped by the pump $G^2$ through the tower $A^2$ and flows therefrom by the pipe $b^2$ into the trough $L^2$ and through the opening $l^3$ into the tank $I^3$ and by the pipe $H^3$ back to the tank $I^4$, the valves being suitably set, as will be readily understood. While the tank $I^3$ is being emptied to supply the tower A' fresh milk of lime or of magnesia is allowed to flow from the reservoir therefor into the tank $I^4$. By this means a continuous flow of liquid through both towers can be maintained to insure a complete absorption of chlorin gas and the full saturation with chlorin of the milk of lime or of magnesia.

Although I have illustrated two towers, as these will generally be sufficient to absorb all the chlorin from gases such as those furnished by the Deacon process, yet more than two such towers may be used, if desired.

The comparatively fresh milk of lime or of magnesia which meets the gases in the second tower insures complete absorption of the chlorin and prevents the discharge of noxious gases into the atmosphere. By the addition of extra connecting pipes and valves it will be evident that the system can be so arranged that either tower can be made the first of the series.

Having now particularly described and ascertained the nature of this invention and in what manner the same is to be performed, I declare that what I claim is—

1. In an apparatus for effecting the absorption of chlorin gas in the manufacture of chlorates and bleaching liquor, the combination with a tower having inlets and outlets for the absorbent liquid and for the gases from which chlorin is to be absorbed and in its interior a series of plates or partitions over which the liquid passes and meets a stream of upwardly-flowing gases containing chlorin, of a refrigerator, two tanks, a pump, pipes or passages— one leading from the tanks to the pump, another from the pump through the refrigerator to the liquid-inlet of the tower, and a third from the liquid-outlet of the tower back to the tanks—and valves for controlling the communication from said first-mentioned pipe to the tanks, respectively, substantially as described.

2. In an apparatus for effecting the absorption of chlorin gas in the manufacture of chlorates and bleaching liquor, the combination with two towers having inlets at their upper ends and outlets at their lower ends for the absorbent liquid, and inlets at their lower ends and outlets at their upper ends for the gases from which chlorin is to be absorbed, the gas-outlet of one tower communicating with the gas-inlet of the other by a suitable pipe or passage, and each tower having in its interior a series of plates or partitions over which the liquid passes and meets a stream of upwardly-flowing gases containing chlorin, of a pair of tanks and a pump for each tower, respectively, constituting two sets of apparatus, pipes or passages connecting the apparatus of each set as follows: one leading from the tanks to the pump, another from the pump to the liquid-inlet of the tower, and a third leading from the liquid-outlet of the tower back to the tanks, valves for controlling the communication from said first-mentioned pipe to the tanks, respectively, and a third pump suitably connected between the two sets of apparatus so as to pump the liquid circulated through one set into the other set, substantially as described.

3. In an apparatus of the kind described, the combination with two towers having inlets at their upper ends and outlets at their lower ends for the absorbent liquid, and inlets at their lower ends and outlets at their upper ends for the gases from which chlorin is to be absorbed, the gas-outlet of one tower being connected to the gas-inlet of the other by a suitable pipe or passage, and each tower having in its interior a series of plates or partitions over which the liquid circulates and meets a stream of upwardly-flowing gases containing chlorin, of a pair of tanks and a pump for each tower, respectively, and a refrigerating device for one tower, constituting in all two sets of apparatus, a trough located above and communicating with the tanks of each set, suitable agitating devices for the tanks, pipes or passages connecting the apparatus of each set as follows: one leading from the tanks to the pump, another from the pump to the liquid-inlet of the tower, said pipe in one set of the apparatus passing through the refrigerator, and a third pipe from the liquid-outlet of the tower to the trough, valves for controlling communication from the first-mentioned pipe to the tanks respectively, a third pump between the two sets of apparatus connected at one end with a pipe communicating with all of the tanks through suitable valve-controlled connections, and at its other end having three branch pipes controlled by valves, two of said branches connecting respectively with the pipe leading from the pump to the tower in each set of apparatus, and the third branch leading to a suitable receiving-tank, substantially as described.

In testimony whereof I have signed my name to this specification in the presence of two subscribing witnesses.

W. R. CLARKE.

Witnesses:
WM. PIERCE,
S. MCCREADY.